US008814352B2

(12) United States Patent
Archambeau et al.

(10) Patent No.: US 8,814,352 B2
(45) Date of Patent: Aug. 26, 2014

(54) METHOD FOR PRODUCING AN ANTI-UV PLASTIC FILM WITH NON-UNIFORM SPATIAL DISTRIBUTION OF THE UV ABSORBER AND PHOTOCHROMIC OPTICAL ELEMENTS COVERED WITH SUCH A PLASTIC FILM

(75) Inventors: Samuel Archambeau, Charenton-le-Pont (FR); Christian Bovet, Charenton-le-Pont (FR); Stephane Perrot, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 0 days.

(21) Appl. No.: 13/505,753

(22) PCT Filed: Nov. 9, 2010

(86) PCT No.: PCT/EP2010/067098
§ 371 (c)(1),
(2), (4) Date: May 3, 2012

(87) PCT Pub. No.: WO2011/058003
PCT Pub. Date: May 19, 2011

(65) Prior Publication Data
US 2012/0218512 A1  Aug. 30, 2012

(30) Foreign Application Priority Data
Nov. 12, 2009 (FR) ..................... 09 57970

(51) Int. Cl.
*G02C 7/10* (2006.01)
(52) U.S. Cl.
USPC ............... 351/159.61; 351/159.6; 351/159.62
(58) Field of Classification Search
USPC ............. 351/159.29–159.32, 159.49, 159.61, 351/159.64, 159.65
See application file for complete search history.

(56) References Cited

U.S. PATENT DOCUMENTS

| 3,762,953 | A | * | 10/1973 | Clarke et al. | 134/38 |
| 3,956,447 | A | * | 5/1976 | Denommee et al. | 264/135 |
| 4,161,557 | A | * | 7/1979 | Suzuki et al. | 428/1.61 |
| 4,173,672 | A | * | 11/1979 | Mannheim | 428/203 |
| 4,289,497 | A | | 9/1981 | Hovey | |
| 5,185,390 | A | * | 2/1993 | Fischer et al. | 524/43 |
| 5,922,642 | A | * | 7/1999 | Tamura et al. | 503/227 |
| 2006/0008653 | A1 | * | 1/2006 | Chen | 428/423.1 |
| 2008/0127432 | A1 | | 6/2008 | Burguiere | |
| 2009/0047424 | A1 | * | 2/2009 | Momma | 427/162 |
| 2011/0186791 | A1 | * | 8/2011 | Furukawa et al. | 252/589 |

FOREIGN PATENT DOCUMENTS

| CA | 1274427 | * | 9/1990 |
| EP | 1 589 367 | | 10/2005 |
| EP | 1 905 890 | | 4/2008 |
| FR | 2 349 149 | | 11/1977 |
| FR | 2 587 501 | | 3/1987 |
| FR | 2 873 589 | | 2/2006 |
| FR | 2 881 230 | | 7/2006 |
| GB | 1 520 099 | | 8/1978 |
| GB | 2 174 711 | | 11/1986 |
| JP | 2000 241601 | | 9/2000 |
| WO | 03/104341 | | 12/2003 |
| WO | 2006/034864 | | 4/2006 |
| WO | 2006/079564 | | 8/2006 |

OTHER PUBLICATIONS

International Search Report dated Feb. 2, 2011, corresponding to PCT/EP2010/067098.

* cited by examiner

*Primary Examiner* — Scott J Sugarman
*Assistant Examiner* — William Alexander
(74) *Attorney, Agent, or Firm* — Young & Thompson

(57) ABSTRACT

Method for producing a plastic film containing a compound absorbing ultraviolet radiation comprising (a) depositing an alcoholic solution of polyvinyl butyral on a transparent plastic support film, (b) evaporating the solvent from the alcoholic solution of polyvinyl butyral so as to form a polyvinyl butyral layer on the transparent support film, (c) printing the polyvinyl butyral layer with an ink absorbing ultraviolet radiation (UV absorber) in a pattern, (d) heating the transparent plastic support film, coated with the printed polyvinyl butyral layer so as to enable at least part of the UV absorber to pass from the polyvinyl butyral layer to the plastic support film, (e) removing the polyvinyl butyral layer, preferably by washing with a suitable solvent. The application also relates to the film obtained by this method and the use of this film for producing a photochromic element with a spatially non-uniform behavior.

17 Claims, No Drawings

METHOD FOR PRODUCING AN ANTI-UV PLASTIC FILM WITH NON-UNIFORM SPATIAL DISTRIBUTION OF THE UV ABSORBER AND PHOTOCHROMIC OPTICAL ELEMENTS COVERED WITH SUCH A PLASTIC FILM

The subject of the present invention is a method for producing a plastic film containing a compound absorbing UV radiation (UV absorber) with a non-uniform spatial distribution, an anti-UV plastic film obtained by this method and the use of such a film for the production of photochromic optical elements covered with such a film.

Photochromic optical elements and in particular photochromic ophthalmic lenses have been known for a long time.

It may be desirable in some cases to have available such photochromic optical elements in which the intensity of the photochromic coloration is not uniform, that is to say it is not uniformly distributed over the entire surface area but is less intense in some places or even absent in others. It may therefore be desirable to have ophthalmic lenses of which only some zones become coloured intensely in the case of exposure to light, or lenses that have a coloration gradient.

U.S. Pat. No. 4,289,497 describes a photochromic lens made of plastic containing a photochromic dye uniformly distributed in said lens. In order to modulate the photochromic behaviour of the lens and in particular to obtain a coloration gradient and/or differences of coloration in various zones of the lens, these zones are soaked for a varying period of time in a bath containing a UV absorber. The longer the soaking time, the more the photochromic behaviour of the dye will be inhibited. It will be understood that such a method certainly enables lenses to be obtained with a gradient of photochromic behaviour, but it is very difficult or even impossible to obtain complex patterns with this method of diffusing the UV absorber within the body of the lens.

Patent application FR 2 349 149 also describes a method for producing ophthalmic lenses with photochromic behaviour having continuous spatial variation. In the method described in this application, a UV-absorbent coating is deposited on at least part of a photochromic support by partially or totally immersing said photochromic support in a bath containing a UV absorber and by progressively withdrawing it at a variable rate. The spatial variation of photochromic behaviour results here from a corresponding spatial variation of the thickness of the UV-absorbent coating. In other words, the more slowly the photochromic support is withdrawn from the bath, the thicker the coating deposited is and the less photochromic the corresponding zone of the lens obtained will be. Such a method makes it possible to obtain lenses with a gradient of photochromic behaviour such as is shown in the single FIGURE of this document, but it will be impossible to obtain more complex and/or high resolution patterns.

International application WO 2006/079564, in the name of the Applicant, discloses a method for colouring an optical lens comprising depositing, on a plastic substrate, a porous ink-receptive layer formed of mineral particles and a polymeric binder (introduced in the form of an aqueous emulsion), printing said layer with an ink containing a dye with the aid of an inkjet printer, and heating the assembly obtained in this way at a sufficient temperature to enable dye to be transferred from the porous layer to the subjacent substrate.

The present invention, described in detail hereinafter, differs from this method, among other things, by the fact that the ink-receptive layer is based on polyvinyl butyral and is not based on mineral particles and a polymeric binder.

Application FR 2 587 501 describes a method for introducing a photochromic dye into a substrate made of plastic by thermally transferring said photochromic dye from a transfer layer previously applied to the substrate. In the method described in this document, the photochromic dye is dissolved, with an organic polymer, in a suitable solvent and the solution obtained in this way is deposited on the substrate and then dried. This method consequently does not include any step of inkjet printing. The photochromic dye, mixed with the polymer before it is deposited, is uniformly distributed throughout the entire transfer layer.

The usable organic polymers enumerated in this document certainly encompass polyvinyl butyral, but a person skilled in the art had no reason to think that the latter would be suitable, in place of mineral particles and a polymeric binder, in a method using inkjet printing as described in application WO 2006/079564.

None of the methods of the state of the art thus makes it possible to satisfy the requirements of a method for creating complex and/or high resolution photochromic images or patterns on optical elements.

A first attempt to prepare optical elements with non-uniform photochromic behaviour, put into practice by the Applicant, consists of inkjet printing a pattern on a transfer paper with an ink containing sublimable UV absorbers, of applying this printed paper to a transparent plastic film and of subjecting the assembly to heat treatment so as to transfer the UV absorber from the paper to the film.

This method essentially has the following two disadvantages:

if the transfer paper is not a high definition paper, ink drops group together and the image or pattern created in this way is of insufficient quality, if the paper is not perfectly smooth, it imprints its texture onto the surface of the plastic film which brings about a deterioration of the optical properties of the film.

This method has thus not enabled a transparent plastic film to be made without a surface texture and containing a high resolution latent image formed by non-uniform distribution of a UV absorber.

The present invention provides a method that makes it possible to overcome the disadvantages of the state of the art by virtue of the use of an absorbent layer, previously deposited at the surface of a plastic film, and which acts as a transfer paper in the method described above without, having the same disadvantages. In point of fact, given that the absorbent layer will be deposited at the surface of the support film in liquid form, there is no risk of printing its texture on said film at the moment of the heating step.

The choice of the material for this absorbent layer is a determining factor. It consists of obtaining a structure capable of absorbing ink droplets deposited by inkjet rapidly and individually. It should in addition have a sufficiently low affinity for the UV absorber so as to transfer it after absorption, during heat treatment, to the subjacent plastic film. After having fulfilled its role as an acceptor and then as a UV absorber donor, the absorbent layer should moreover be easily removed from the plastic film, for example by peeling or washing with solvents that are inert towards the plastic film.

The Applicant, after having tested a certain number of polymers and mixtures of polymers, has discovered that polyvinyl butyral (PVB) fulfils all the above criteria and is perfectly suitable in this way for the method of the invention described hereinafter.

The subject of the present invention is consequently a method for producing a plastic film containing a compound absorbing ultraviolet radiation, comprising (a) depositing an alcoholic solution of polyvinyl butyral on a transparent plastic support film, (b) evaporating the solvent from the alcoholic solution of polyvinyl butyral so as to form a polyvinyl butyral layer on the transparent support film, (c) printing the polyvinyl butyral layer with an ink containing a compound absorbing ultraviolet radiation (UV absorber) in a pattern, (d) heating the transparent plastic support film, coated with the printed polyvinyl butyral layer to a temperature and for a time sufficient to enable at least part of the UV absorber to pass from the polyvinyl butyral layer to the plastic support film, (e) removing the polyvinyl butyral layer, preferably by washing with a suitable solvent.

The plastic support film should be largely transparent to visible light and naturally to UV radiation. Polyethylene terephthalate (PET) is particularly preferred, but the film may be made of a cyclo-olefin copolymer (COC) or of polyvinyl acetate (PVA), available in the form of films with a thickness of between 50 and 150 micrometers, in particular between 75 and 125 micrometers.

The polyvinyl butyral used within the context of the invention, advantageously has a molecular mass between 50 000 and 70 000, so as to enable it to dissolve easily in step (e) of the method.

In order to deposit the absorbent layer, polyvinyl butyral is dissolved in an alcoholic solvent that is inert towards the support film. As suitable solvents, mention may be made of the lower alcohols such as ethanol, n-propanol, iso-propyl alcohol, n-butanol and isobutanol, as well as alkylene glycol alkyl monoethers such as propylene glycol monomethyl ether or 1-methoxy-2-propanol (Dowanol PM).

The concentration of this depositing solution depends on the thickness of the absorbent layer that it is desired to obtain and the application method. It is generally between 5 and 25% by weight, in particular between 10 and 15% by weight.

Deposition of the polyvinyl butyral solution during step (a) may be carried out in principle by any known technique enabling thin polymeric coatings to be obtained having a uniform thickness of a few micrometers to a few tens of micrometers. Spin coating and bar coating are particularly preferred.

After depositing the solution and before the printing step, the solvent must be evaporated, which is generally carried out by heating at moderate temperatures, generally between 40 and 90° C., preferably between 60 and 80° C., possibly under reduced pressure.

The absorbent layer of polyvinyl butyral preferably has a thickness of between 3 and 50 micrometers, in particular between 5 and 20 micrometers.

The plastic support film covered with the absorbent PVB layer is then printed with a pattern or image with an ink containing a compound absorbing ultraviolet radiation, hereinafter called a UV absorber. The printed image or pattern is of course latent, in other words invisible to the naked eye, and only becomes visible after the UV absorber has been transferred to the support film, the support film has been fixed onto a photochromic optical element and after the assembly has been exposed to ultraviolet radiation.

This printing is preferably carried out by inkjet with conventional printing devices. It will be advisable on this occasion to adjust printing so that the size of the droplets is sufficiently small and their spacing is sufficiently large so that the droplets do not group together before penetrating the absorbent layer. Grouping the droplets would in point of fact considerably reduce the resolution of the latent image obtained. Such a printing adjustment is available to a person skilled in the art. It may possibly be necessary to print the absorbent layer several times.

The ink used in step (c) advantageously contains 10 to 30% by weight of the UV absorber dissolved in a solvent. The solvent should have two specific properties: it should be absorbable by polyvinyl butyral and be able to dissolve 10 to 30% by weight of UV absorber. Ethylene glycol butyl ether has these two properties.

The chemical structure of the UV absorber does not determine the moment when the compound may be incorporated in the ink that may be applied by inkjet. As an example of UV absorbers, mention may be made of those described in international application WO 03/104341. Absorbers of the benzophenone family, such as for example Cyasorb UV24 and Cyasorb UV9 have given particularly valuable results.

After the printing step, the plastic film coated with the absorption layer is ready for the transfer of the UV absorber to the subjacent film (step (d)). This transfer is carried out by heating the assembly to a temperature above the glass transition temperature of the plastic film, preferably between 120° C. and 170° C., and in particular between 140 and 160° C.

The duration of the heating step (d) is preferably between 3 and 45 minutes, in particular between 5 and 30 minutes.

In the method as described above, the PVB absorbent layer is applied directly onto the transparent plastic support film. In a variant of the method according to the invention, an intermediate layer formed of a water soluble polymer is inserted between the support and the polyvinyl butyral absorbent layer. Such a layer could not only facilitate removal of the absorbent layer deposited thereon, but could also serve as the polyvinyl butyral layer, to receive compounds which would then be transferred during the heating step (d) to the subjacent support film.

In an embodiment of the method according to the invention, the PVB solution is thus not directly deposited on the plastic support but on an intermediate layer containing a water soluble polymer, previously deposited on the plastic film. The water soluble polymer forming the intermediate layer is preferably of polyvinyl alcohol (PVA).

In an embodiment of the method according to the invention, this PVA layer is printed with an aqueous ink containing one or more sublimable water soluble dyes. Other steps of the method, namely (a) deposition of the absorbent layer, (b) drying, (c) printing and (d) transfer, remain unchanged. The presence of the dye in the intermediate PVA layer then makes it possible, during step (d) to transfer to the support film both the sublimable dye from the PVA layer and the UV absorber from the PVB layer and in this way to create mixed patterns formed by dyes and UV absorbers in the support film. In a variant of the method, the dye may be made to diffuse separately from the PVA layer to the support film by a heating step before carrying out steps (a) to (d).

After the heating step (d), the PVB absorbent layer and the intermediate PVA layer, which may be present, should be removed. This removal is preferably achieved by washing with a suitable solvent. The alcoholic solvents mentioned above may be cited as examples of a solvent for PVB. In the case where the absorbent PVB layer rests on an intermediate PVA layer, this washing may advantageously be carried out with water, the water soluble PVA layer entraining the PVB layer with it. If necessary, this water rinse is complemented by an alcoholic solvent rinse.

At the end of step (e) for the removal of the absorbent layer, a transparent plastic film is then obtained that contains a UV absorber with a distribution corresponding to the image printed in stage (c). To the knowledge of the Applicant, such a plastic film, preferably made of PET, having a uniform thickness and containing a UV absorber distributed in a non-uniform manner has not been described until now and consequently constitutes another subject of the invention. Such a film has in principle a transparency to visible light that is substantially identical to that of the starting film, apart from any possible absorption due to a dye introduced during the process. On the other hand, its transparency to UV radiation is different from that of the starting film by reason of the presence of a "latent" image invisible to the naked eye, formed by the UV absorber introduced during the production process.

The film obtained may then be fixed to any photochromic optical support. During exposure of the optical element obtained in this way to UV radiation, the latent image will then be revealed in the form of an attenuation or absence of photochromic behaviour at locations where UV radiation is absorbed by the UV absorber and does not affect the photochromic dye.

Consequently, the subject of the present invention is additionally a method for producing a photochromic optical element, comprising a method for producing a plastic film as described above, and an additional step (f) of fixing the plastic film obtained to a photochromic optical support.

A photochromic optical element capable of being produced by this method is also a subject of the invention. This optical element contains a photochromic optical support and a transparent film containing a UV absorber distributed non-uniformly, namely in an image.

As examples of such optical elements, mention may be made of ophthalmic lenses, lenses for optical instruments, filters, lenses for optical viewfinders/visors, eye shades/visors and optics for lighting devices. Preferably, an ophthalmic lens is concerned, whether correcting or non-correcting.

Mention may in particular be made to optical elements such as those described in application FR 2 873 589 by the Applicant. These optical elements comprise an assembly of closed cells or microvessels, separated from each other and juxtaposed parallel to a surface of said optical element, each cell being filled with a suitable optical material that is liquid or solid, so that the assembly of cells filled in this way gives the optical element a desired optical characteristic such as photochromism. In such an optical element, the transparent plastic film of the present invention advantageously constitutes the film sealing the cells or microvessels containing the photochromic dye.

The invention claimed is:

1. Method for producing a plastic film containing a compound absorbing ultraviolet radiation, comprising
   (a) depositing an alcoholic solution of polyvinyl butyral on a transparent support film made of plastic
   (b) evaporating the solvent from the alcoholic solution of polyvinyl butyral so as to form a polyvinyl butyral layer on the transparent support film,
   (c) printing the polyvinyl butyral layer with an ink containing a compound absorbing ultraviolet radiation (UV absorber) in a pattern,
   (d) heating the transparent plastic support film, coated with the printed polyvinyl butyral layer to a temperature and for a time sufficient to enable at least part of the UV absorber to pass from the polyvinyl butyral layer to the plastic support film,
   (e) removing the polyvinyl butyral layer, preferably by washing with a suitable solvent.

2. Method according to claim 1, wherein the polyvinyl butyral solution is not deposited directly on the plastic support but on an intermediate layer containing a water soluble polymer, previously deposited on the plastic film.

3. Method according to claim 2, wherein the water soluble polymer forming the intermediate layer is polyvinyl alcohol (PVA).

4. Method according to claim 1, wherein deposition of the polyvinyl butyral solution during step (a) is carried out by spin coating or by bar coating.

5. Method according to claim 1, wherein printing of the polyvinyl butyral layer in step (c) is carried out by inkjet.

6. Method according to claim 1, wherein the transparent support film has a uniform thickness of between 50 and 150 micrometers.

7. Method according to claim 1, wherein the polyvinyl butyral layer obtained after evaporating the solvent has a uniform thickness of between 3 and 50.

8. Method according to claim 1, wherein the ink used in step (c) contains 10 to 30% by weight of UV absorber.

9. Method according to claim 1, wherein the heating temperature (step (d)) lies between 120° C. and 170° C.

10. Method according to claim 1, wherein the duration of heating (step (d)) lies between 3 and 45 minutes.

11. Method for producing a photochromic optical element, comprising
    a method for producing a plastic film according to claim 1, further comprising
    an additional step (f) of fixing the plastic film obtained onto a photochromic optical support.

12. Method according to claim 1, wherein the compound absorbing ultraviolet radiation is non-uniformly distributed in said film.

13. Method according to claim 12, wherein said film covers an optical element.

14. Method according to claim 13, wherein said optical element is an ophthalmic lens.

15. Method according to claim 1, wherein the transparent support film made of plastic is polyethylene terephthalate (PET).

16. Method according to claim 1, wherein the transparent support film has a uniform thickness of between 75 and 125 micrometers.

17. Method according to claim 1, wherein the polyvinyl butyral layer obtained after evaporating the solvent has a uniform thickness of between 5 and 20 micrometers.

* * * * *